United States Patent

Krishna et al.

Patent Number: 5,987,453
Date of Patent: Nov. 16, 1999

[54] METHOD AND APPARATUS FOR PERFORMING A JOIN QUERY IN A DATABASE SYSTEM

[75] Inventors: Murali M. Krishna, Hillsboro, Oreg.; Anurag Kashyap, Fremont, Calif.; Robert Howard Gerber, Portland, Oreg.; Paul Sherwood Taylor, Redwood City, Calif.; Scott Alan Shurts, Aloha, Oreg.; Shengsong Ni, Tigard, Oreg.; Prakash Sundaresan, Portland, Oreg.

[73] Assignee: Informix Software, Inc., Menlo Park, Calif.

[21] Appl. No.: 08/833,519

[22] Filed: Apr. 7, 1997

[51] Int. Cl.⁶ .................................................. G06F 17/30
[52] U.S. Cl. ........................................ 707/4; 707/2; 707/5
[58] Field of Search .................................... 707/2, 4, 3, 5

[56] References Cited

U.S. PATENT DOCUMENTS

| | | | |
|---|---|---|---|
| 5,412,804 | 5/1995 | Krishna | 707/2 |
| 5,452,238 | 9/1995 | Kramer et al. | 364/578 |
| 5,551,031 | 8/1996 | Cheng et al. | 707/2 |
| 5,557,791 | 9/1996 | Cheng et al. | 707/2 |
| 5,590,362 | 12/1996 | Baum et al. | 707/4 |
| 5,604,892 | 2/1997 | Nuttall et al. | 395/500 |
| 5,668,994 | 9/1997 | Swagerman | 395/672 |

OTHER PUBLICATIONS

C.J. Date, Introduction to Database Systems, Jan. 1990, pp. 149–153, 623–624.

*Primary Examiner*—Paul R. Lintz
*Assistant Examiner*—Cheryl R. Lewis
*Attorney, Agent, or Firm*—Fish & Richardson P.C.

[57] ABSTRACT

A computer implemented method for generating a response to a join. Two tables are divided into fragments. A join fragment map identifies, for each respective fragment from the first table, the fragments from the second table which contain a record that satisfies the join predicate with a record from the respective fragment from the first table. The map is used to eliminate fragments which cannot satisfy the join predicate.

35 Claims, 9 Drawing Sheets

| 40 | 42 R.number | 44 R.name | 46 R.state | 48 R.month |
|---|---|---|---|---|
| | 1001 | Johnson | CA | January |
| | 1002 | Brown | AZ | April |
| | 1003 | Smith | HI | August |
| | 1004 | Taylor | CA | February |
| | ⋮ | ⋮ | ⋮ | ⋮ |
| | | | | |

FIG. 2A — 32

| 50 | 52 S.number | 54 S.name | 56 S.state | 58 S.week | 59 S.mumber |
|---|---|---|---|---|---|
| | 2001 | Abstract Designs | DC | week #45 | 1001 |
| | 2002 | Brown Shoes | AZ | week #2 | 1002 |
| | 2003 | California Kitchen | CA | week #5 | 1003 |
| | 2004 | Donut Shop | AZ | week #4 | 1004 |
| | ⋮ | ⋮ | ⋮ | ⋮ | ⋮ |
| | | | | | |

| R.state | Fragments from R containing this state |
|---|---|
| AZ | 4, 5, 9, 12 |
| CA | 1, 2, 7, 9, 11 |
| IL | 6, 7 |
| ⋮ | ⋮ |

FIG. 3B

| S.state | Fragments from S containing this state |
|---|---|
| AZ | 2, 4, 7, 27, 39 |
| CA | 5, 7, 27, 30, 31, 45 |
| IL | 50 |
| ⋮ | ⋮ |

FIG. 4

| Fragment number from Table R | Fragment numbers from Table S |
|---|---|
| 1 | 5, 7, 27, 30, 31, 45 |
| 2 | 5, 7, 27, 30, 31, 45 |
| 3 | |
| 4 | 2, 4, 7, 27, 39 |
| 5 | 2, 4, 7, 27, 39 |
| 6 | |
| 7 | 5, 7, 27, 30, 31, 45 |
| 8 | |
| 9 | 2, 4, 5, 7, 27, 30, 31, 39, 45 |
| 10 | |
| 11 | 5, 7, 27, 30, 31, 45 |
| 12 | 2, 4, 7, 27, 39 |

METHOD AND APPARATUS FOR PERFORMING A JOIN QUERY IN A DATABASE SYSTEM

BACKGROUND

The present invention relates generally to database systems, and more particularly to methods and apparatus for the processing of queries having join predicates by database systems.

A database is a collection of information. A relational database is typically illustrated as one or more two-dimensional tables. Each table arranges items and attributes of the items in rows and columns. Each table row corresponds to an item (referred to as a record), and each table column corresponds to an attribute of the item (referred to as a field). In a relational database a collection of tables can be related to each other through a common attribute or "key". The common key enables information in one table to be automatically cross-referenced to corresponding information in another table.

A complex search may be performed on a database with a "query". A query includes one or more predicates to specify the information for a database system to retrieve from the database. A join query is a query which requests information from more than one table. For example, in a database which stores customer information in one table and credit card transactions in another table, a join query may request the transactions in which customers made a purchase in the same state as their residence. A join query must include at least one join predicate to specify the criteria to select records from the two tables (e.g., that the state of residence of the customer be the same as the state in which the transaction occurred). A join query may also include one or more single-table predicates to select records from the individual tables.

To perform a join query, a conventional database system examines every record in the second table for each record in the first table to determine whether any records satisfy the join predicate. Such records may be said to "match." The database system then constructs a query table from the matching records.

In many circumstances, conventional database operations may be unacceptably slow when performing a join query. Several techniques have been developed to reduce the time required to process join queries. One technique to improve the performance of a join query is to reduce the amount of data searched by the database system. In particular, records that cannot satisfy the join predicate should be eliminated from both tables of the query.

An example of such a technique may be illustrated with the following query:

SELECT * FROM R, S     [Example 1]

WHERE R.r = S.s and R.r < 10;

This query attempts to find all records that satisfy the join predicate R.r=S.s.

Since records from Table R must also satisfy the predicate R.r<10 and since R.r must equal S.s, by applying the algebraic rule of transitivity, the database system can determine that matching records of Table S must also satisfy the condition S.s<10.

After deducing the predicate on S, the database system may apply the predicate to eliminate records from the scan of S that cannot possibly contribute to the result of the join.

Fragmentation is another technique used to increase the processing speed of queries. Fragmentation breaks a table into horizontal sections called fragments. After fragmentation, the table consists of a collection of fragments.

A fragment contains a set of records. The criteria for storing a record in a fragment is defined by the user and is known as the 'fragmentation scheme.' It is possible for a fragment to be empty if none of the records satisfy the criteria.

A 'scan' is the process of reading a fragment of a table. Fragments may be stored independently on separate disks or on separate nodes in a cluster or network architecture. Logically, all fragments may be scanned simultaneously, thereby increasing the overall rate at which the complete table can be read. By definition, to read more than one fragment simultaneously, the database system must use multiple scan operators.

'Fragment elimination' is a process by which the database system can identify fragments from a table that cannot participate in the result of the query and remove those fragments from consideration. An example of fragment elimination may be illustrated with the following query:

SELECT*FROM R where R.month>"September" [Example 2]

Assume that Table R has 12 fragments—one for each month of the year—and that the R.month column identifies the fragment for each record in Table R. For example, fragment #1 contains all records whose R.month value is "January", fragment #2 contains all records whose R.month value is "February," and so on.

Using the query in Example 2 and the fragmentation scheme, the database system is able to eliminate all but three fragments, namely fragments #10–#12, corresponding to records whose R.month value is "October", "November" or "December". The eliminated fragments #1–#9 cannot possibly return records satisfying the query and need not be scanned. Thus, fragment elimination allows the database system to scan three fragments instead of all twelve.

SUMMARY OF THE INVENTION

In one aspect, the invention is directed to a computer implemented method for generating a response to a join. The join has a join predicate between a first table having a first plurality of fragments and a second table having a second plurality of fragments. A join fragment map is retrieved. The join fragment identifies, for each respective fragment from the first table, the fragments from the second table which contain a record that satisfies the join predicate with a record from the respective fragment from the first table. The map is used to eliminate fragments which cannot satisfy the join predicate.

Among the advantages of the invention are the following. The join query may be performed quickly, and the performance of other similar join queries may be improved for all users on the system.

Additional advantages of the invention will be set forth in the description which follows, and in part will be obvious from the description, or may be learned by practice of the invention. Advantages of the invention may be realized and obtained by means of the instrumentality and combinations particularly pointed out in the claims.

BRIEF DESCRIPTION OF THE DRAWINGS

The accompanying drawings, which are incorporated and constitute a part of the specification, schematically illustrate the invention and, together with the general description given above and the detailed description given below, serve to explain the principle of the invention.

FIGS. 2A and 2B illustrate tables of the relational database of FIG. 2.

FIGS. 3A and 3B illustrate fragment maps of the tables of FIGS. 3A and 3B, respectively.

FIG. 4 illustrates a join map in accordance with the present invention.

DETAILED DESCRIPTION

The present invention provides a method and apparatus embodying what will be referred to as "Co-Fragment Elimination", by which a database system can optimize the processing of a join by eliminating fragments from one table using information from another table. As used in the specification and claims, the term "table" is used to denote any collection of records.

A join, in its most general form, is an operation that collects information from two or more tables. This is done by specifying one or more join predicates that combine information from records of the tables involved. For example, a general single predicate join between two tables R and S, can be specified by the following query:

SELECT R.all, S.all

FROM R, S

WHERE f(r) relop g(s)

where f(r) denotes any function derived from the fields of a record r of R, g(s) denotes any function derived from the fields of a record s of S, and relop is any one of (=, !=, <, <=, >, >=. The join predicate in the above query is f(r) relop g(s). f(r) can be as simple as R.state or something much more complex that is any function of one or more columns of R.

The result of a join operation may be returned directly to a user or may be further processed before it is returned to a user. Such subsequent processing of join output may also be used for purposes of updating, inserting or deleting other data records in a database. The present invention applies to all such activities based upon the output of a join.

Figure 1:
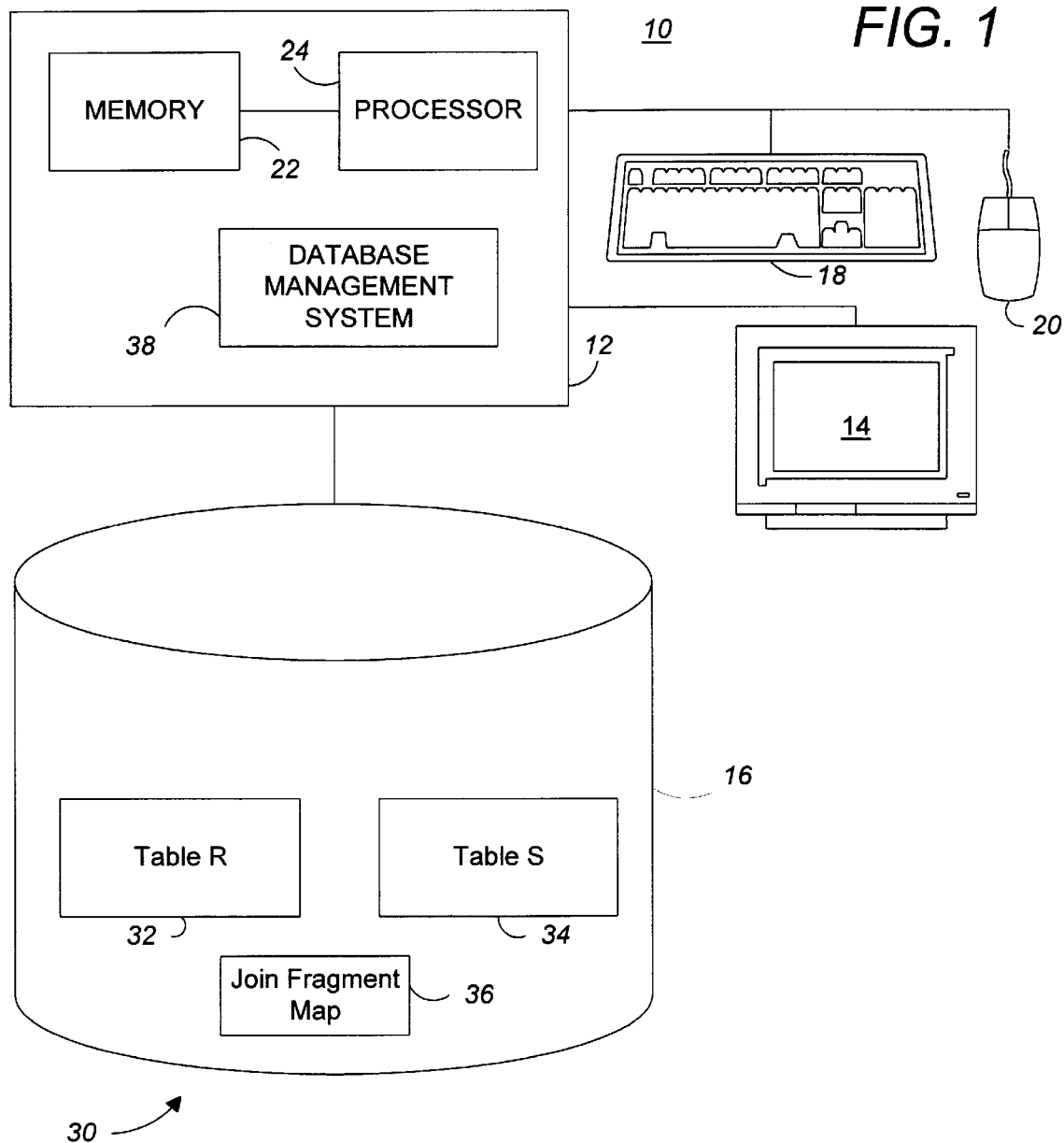
FIG. 1 illustrates a general purpose computer system programmable in accordance with the invention and including a relational database.

Referring to FIG. 1, a general purpose computer system 10 runs programs enabling a user to view and perform queries on data in a database. The computer system 10 includes a digital computer 12 (such as a personal computer or a workstation), a display 14, a mass storage device 16 (such as a floppy-disk drive, a hard-disk drive, a CD-ROM drive, or a magneto-optical disk drive), a keyboard 18, and a mouse 20 or other pointer device (such as an input tablet). The computer 12 is of conventional construction and includes a memory 22, a processor 24, and other customary components, such as a memory bus and a peripheral bus (not shown). The computer 12 also includes communications hardware and programs (not shown) by which the computer system 10 may be connected over a communications link (not shown) to other computers (not shown) to form a computer network.

The computer system 10 includes a database 30 for storing and processing data. The database 30 may be centralized on a single computer, or it may be distributed across the computer network. Typically, the database 30 will be managed by a database management system 38 running on a computer linked to the database, either permanently or transiently, although in this illustration the database management system is shown as running on the computer 12.

The invention will be illustrated using a database configured to store information for a credit card company. The database 30 is a relational database with a customer table ("Table R") 32 and a transaction table ("Table S") 34. In addition, the database 30 includes a join fragment map 36 bitmap (discussed below with reference to FIGS. 5–6). The database 30 may also include other resources, such as rules for interacting and manipulating objects, index tables, and interpreters to execute query requests (not shown).

Referring to FIG. 2A, the customer table 32 includes a record 40 for each customer. Each record 40 includes a customer number field (R.number) 42, a customer name field (R.name) 44, one or more customer address fields, including a customer state field (R.state) 46, and a credit card expiration month field (R.month) 48. The customer table 32 is partitioned into twelve fragments, one for each expiration month. Each fragment contains records only for its expiration month.

Referring to FIG. 2B, the transaction table 34 includes a record 50 for each credit card transaction. Each record 50 includes a transaction number field (S.number) 52, a merchant name field (S.name) 54, a merchant state field (S.state) 56, a transaction date field (S.week) 58, and a customer number field (S.rnumber) 59. The customer number fields 42 and 59 may be used as keys to link Table S to Table R. For these illustrations, the transaction table 34 is fragmented into fifty-two fragments, each fragment containing the records for transactions having a transaction date in one of the fifty-two weeks of the year.

Returning to FIG. 1, a user (a human or a program) may submit a join query to retrieve information from the database 30. For example, the user may query the database 30 to list records in which the customer state field R.state and the transaction state field S.state have the same value.

Now consider the following query

SELECT * FROM R, S     [Example 3]

WHERE R.month > "September"

AND R.state = S.state

As discussed with reference to the query of Example 2, the database system can eliminate nine fragments from Table R by applying known single-table techniques.

To eliminate other fragments, the database system generates or accesses the join fragment map 36. The join fragment map 36 indicates which fragments from the two tables do not contain records which can satisfy the join predicate and need not be searched during the query execution. Thus, the join fragment map is specific both to the content of the database and the join predicate. If the content of the database changes, the join fragment map may become invalid. The join fragment table 36 may be stored as a bitmap, as multiple field-fragment maps, or as a fragment-fragment map or other data structure that indicates which pairs of fragments do not contain records that can satisfy the join predicate. The join fragment map may be composed from two field-fragment maps 60 and 70 (see FIGS. 3A and 3B) for the two tables in the query. The join fragment map may be implemented in a database system using a relational, hierarchial, object-oriented, or non-relational database.

Referring to FIG. 3B, the database system 30 generates or accesses a field-fragment map 70. The field-fragment map 70 indicates which fragments from Table S contains records from which states. The field-fragment map 70 includes an entry 72 for each state. Each entry 72 matches a particular state 74 to a list 76 of fragments from Table S that contain records that match the state. For example, field-fragment map 70 includes a list of fragments from Table S that contain records with S.state="CA", a list of fragments that contain records with S.state="AZ", and so on. Since there are fifty states, there would be fifty entries 72, some of which may be empty, in the field-fragment map 70. Each list 76 will contain at most fifty-two fragment numbers because there are fifty-two fragments in Table S.

Referring to FIG. 3A, the database system 30 generates or accesses a similar field-fragment map 60 for Table R. The field-fragment map 60 also includes an entry 62 for each state. Each entry 62 matches a particular state 64 to a list 66 of fragments from Table R that contain records that match the particular state. There should be fifty entries 62, some of which may be empty, but each list 66 will contain at most twelve fragment numbers because there are only twelve fragments in Table R.

Referring to FIGS. 3A and 3B, by reading the first row of the field-fragment maps 60 and 70 together, the database system may determine that some records from certain fragment numbers (4, 5, 9 and 12) of Table R will be match some records from certain fragment numbers (2, 4, 7, 27 and 39) of Table S. Similarly, by reading from the second row of each map, the database system may determine that records from certain fragment numbers (1, 2, 7, 9 and 11) of Table R will match records from certain fragment numbers (5, 7, 27, 30, 31 and 45) of Table S.

Referring to FIG. 4, the join fragment map may be composed of a single fragment-fragment map 80, formed by combining the two fragment maps 60 and 70. The fragment-fragment map may be created by eliminating the state columns 64 and 74 from the two field-fragment maps. The fragment-fragment join map 80 will contain twelve entries 82, i.e., one entry for each fragment of Table R. Each entry 82 will include a list 86 of fragment numbers from Table S that contain records that satisfy join predicate with records from the associated fragment 84 of Table R. For example, the first entry has a list of fragments (5, 7, 27, 30, 31, 45) from Table S that contain records that satisfy the join predicate with one or more records from fragment ∩1 of Table R. In this illustration, the fragment-fragment map 80 was generated by combining only the first two rows of the two field-fragment maps 60 and 70.

Figure 5:
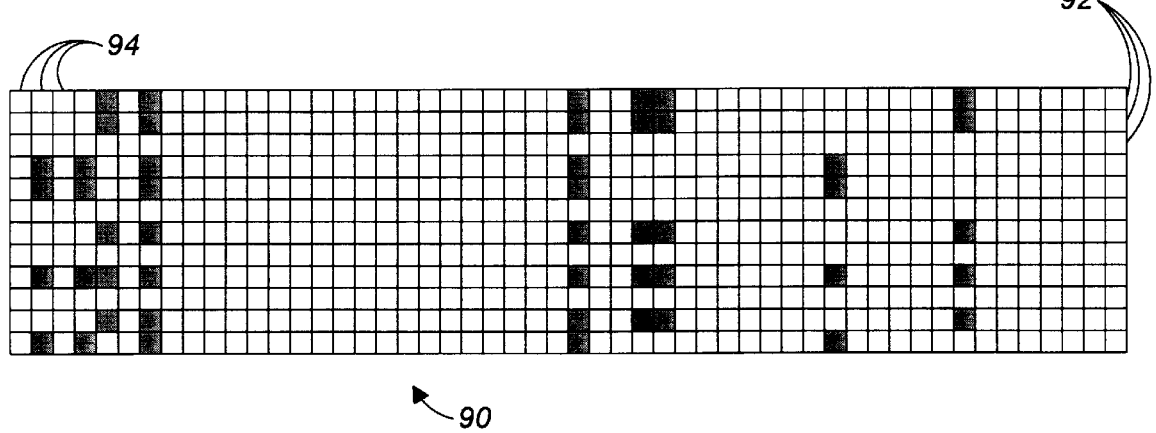
FIG. 5 illustrates a bitmap derived from the join map of FIG. 5.

Referring to FIG. 5, the fragment-fragment map 80 can be transformed into a bitmap 90. Instead of a list of fragment numbers, the bitmap 90 includes a row 92 for each fragment of Table R and a column 94 for each fragment of Table S. In the bitmap 90, an "on" bit (shown as shaded in the Figure) denotes that some record in the fragment of Table S will join with the corresponding fragment of Table R. The bitmap 90 may be compressed, for example, by run-length encoding or other techniques.

The bitmap 90 can be used to eliminate fragments from either table involved in the join query, as will be described in terms of the present example and the query of Example 3. Using the single-table predicate (R.month>"September"), fragments #1–#9 of Table R are eliminated. From the bitmap 90, certain remaining fragments of Table R, such as fragment #10, can be eliminated because they do not contain records that would satisfy the join predicate with records from any fragment of Table S. Similarly, the bitmap 90, shows that certain fragments of Table S do not contain records that would match records in fragments #10–#12 of Table R. For example, fragments #1, #3, #6, #8–#26, #28–#29, #32–#38, #40–#44 and #46–#52 of Table S cannot contribute any records which will satisfy the join predicate. Therefore, using the bitmap 90, the database system can eliminate all but two fragments from Table R and all but nine fragments from Table S.

After co-fragment elimination, the database system has to search only nine fragments of Table S for each record in the two fragments of Table R. In contrast, in the prior techniques, all fifty-two fragments of Table S would be searched for each record in three fragments of Table R. The commonly used join methods are the hash join method, the sort merge join method, and the nested loops methods. The latter may be performed with or without an index. Our invention applies to any join method. For purposes of the claims, the term "searching" does not imply the use of one particular join method.

The bitmap 90 is reversible. That is, fragments eliminated from Table S (based on single-table predicates) can be used, with the bitmap 90, to eliminate fragments from Table R that join only with the eliminated fragments of Table S.

The bitmap 90 can also be used at the execution of the query to dynamically eliminate fragments. Again referring to the query of Example 3, after optimization, the database system has eliminated all but two fragments from Table R and all but nine fragments of Table S. In prior techniques, the join operator would read each record of Table R from the three fragments and scan each of the remaining nine fragments of Table S for records which satisfy the join predicate. However, for any particular record in Table R, not all nine fragments of Table S need be searched. The bitmap shows that a record from Table R fetched from fragment #11 can only find matches in six of the nine remaining fragments of Table S, namely fragments #5, #7, #27, #30, #31 and #45. Therefore, for this particular record from Table R, only six fragments of Table S need be scanned. Similarly, if the record fetched from Table R is from fragment #12, then only five fragments from Table S need be scanned, namely fragments #2, #4, #7, #27 and #39.

The creation of a bitmap can be triggered in a number of ways. The query optimizer can decide to create the bitmap as a query processing strategy. A user can explicitly create a bitmap using the data definition language for a given database in similar fashion to the creation of an index. The database system can implicitly create a bitmap when a foreign key relationship is specified as an integrity constraint. The system can exhaustively search for joins between tables that yield sparse bitmaps.

In all of these cases, the system can use sampling to verify the expected sparseness of a resulting bitmap. The sparseness is the percentage of bits that are turned on in a bitmap indicating fragments from two tables that have matching tuples.

To generate (or build) the bitmap 90, the database system executes a 'simplified query' based on the original query. The simplified query contains the same join predicate as the original query, but none of the single-table predicates. For example, the simplified query for the query of Example 3 is:

SELECT R.fragment#, S.fragment# FROM R, S    [Example 4]

WHERE R.state = S.state

Executing the simplified query returns the corresponding fragment numbers from each table that contain matching records. The bitmap 90 may be generated directly, without generating the intermediate join map 80 described above. Various techniques may be used to increase the speed with which the simplified query is executed. Preferably, the necessary fields of the records from the first or second table are retrieved from the leaves of a table index rather than from the table itself. In addition, column indices can be used, if they exist. As another example, information from the fragmentation scheme may be used. Under certain implementations of the simplified query, once a match has been made between fragments from the two tables, other records need not be searched for the same match.

The creation of a bitmap may be aborted if the bitmap becomes too full, i.e., non-sparse, indicating that records from a fragment of the first table have corresponding matching records in a large percentage of the fragments from the second table.

Sampling is used on both the first and second table for purposes of building the bitmap to arrive at an early determination of whether the bitmap will be sufficiently sparse.

The bitmap may be stored only in volatile memory as opposed to being stored in the non-volatile metadata for a database.

There is a performance cost to building the bitmap 90. Specifically, there is a cost to executing the simplified query and storing the resulting bitmap. Therefore, the database system must decide whether the bitmap can provide a sufficient gain in performance to warrant the cost of building the bitmap. Generally, the bitmap can provide the greatest benefit if it can be used more than once, for example, in subsequent queries.

Whenever a bitmap is created, if the bitmap is not sufficiently sparse by comparison to a system threshold, the system persistently remembers that fact in the metadata definition of a database to avoid unnecessary subsequent attempts to recreate the bitmap.

The fragment join map may be used when the user explicitly fragments the data so as to make the map sufficiently sparse. It can also be used if the data between two tables is implicitly 'correlated' so as to result in a sufficiently sparse co fragmentation map.

The database system needs a different bitmap 90 for each combination of tables, columns, and join predicates. For example, one would need separate bitmaps for the following two queries SELECT * FROM R, S WHERE R.state = S.state    [Example 5]

SELECT * FROM R, S WHERE R.state < S.state    [Example 6]

However, the same bitmap can be used if the query uses the same join predicate but includes different single-table predicates.

If the query includes multiple join predicates, then a fragment join map may be generated for each sample join in the multiple join map. For example, if the query was SELECT * FROM R, S    [Example 7]

WHERE R.state = S.state and R.name = S.name then one fragment join map would be generated using a simple query with R.state=S.state and another fragment join map would be generated using a simple query with R.name=S.name.

In addition, bitmaps of simple join predicates can be combined to generate the bitmap for a multiple join query. In this illustration predicate P1 is R.state=S.state and predicate P2 is R.name=S.name. The bitmap for the query SELECT*FROM R,S WHERE P1 and P2    [Example 8]

can be generated by a logical AND to the bitmaps for P1 and P2. Similarly, the bitmap for the query SELECT*FROM R,S WHERE P1 or P2    [Example 9]

can be generated by applying a logical OR to the bitmaps for P1 and P2.

In general, the database can handle multiple join predicates. For example, if the query is:

SELECT R.all, S.all

FROM R, S

WHERE f1(r) relop1 g1(s) and/or f2(r) relop2 g2(s) and/or

...

...

...

fn(r) relopn gn(s)

then the database system can build one fragment join map for all the n predicates combined, or it can build n individual fragment join maps, one for each join predicate, or any intermediate combination of fragment join maps between these two extremes. However, if the database system builds a bitmap corresponding to two or more predicates, then that bitmap can only be used for a query that includes the same predicates. That bitmap cannot be used if the query has a smaller number of predicates. Thus for maximum utility it might be beneficial to build one fragment join map for each single join predicate. These individual join fragment maps may be ANDed or ORed as dictated by the query. Co-fragment elimination may also be performed on joins on three or more tables, such as SELECT*FROM R,S,T WHERE R.a=S.a=T.a    [Example 10]

which is the same as the query

SELECT*FROM R,S,T WHERE R.a=S.a AND S.a=T.a

In the illustration of Example 10, B1 will be the bitmap for "R.a=S.a" and B2 will be the bitmap for "S.a=T.a".

As discussed above, bitmap B1 can be used to eliminate fragments from Tables R and S, and bitmap B2 can be used to eliminate fragments from Tables S and T.

Two techniques may be used to reduce fragments between Tables R and T. In the first technique, a bitmap B3 is constructed by combining the bitmaps B1 and B2. This technique is similar to combining join maps to construct bitmaps. Then bitmap B3 can be used to reduce R and T.

In the second technique, the fragments eliminated from Table S (due to bitmap B2) can be used to eliminate fragments from Table R again. In general, the database system would begin by using single-table fragment elimination to eliminate fragments from Tables R, S and T independently. Then bitmap B1 is used against Table R to eliminate fragments from Table S, and bitmap B2 is used against Table S to eliminate fragment in Table T. Then the database system uses the newly eliminated fragments in Table T to reduce Table S again, and then it uses the newly eliminated fragments in Table S to reduce Table R again. The database system continues to repeat this procedure until no more fragments can be eliminated from any table.

The database system should pick the former procedure if join queries between Tables R and T are common since that procedure results in generating bitmap B3 (without explicitly building it using a "simplified bitmap query") which can be stored and used later. On the other hand, the database system should pick the latter procedure if the join queries between Tables R and T are relatively rare and do not warrant the overhead of maintaining bitmap B3.

Since the join fragment map is generated from the result of an actual join query, i.e., since the map depends upon the actual data in the tables, its usefulness is diminished or even destroyed when the underlying tables are modified.

If records have been deleted from one or both tables, the bitmap can still be used. Performance may be less than ideal as the database system may search fragments that no longer have matching records.

If records have been added or updated in one or both tables, the integrity of the bitmap may be destroyed. If the added or modified value now qualifies the fragment as one that contains matching records whereas prior to the update the fragment did not qualify, the integrity of the bitmap has been violated. Thus, the database system must assume that the integrity of the bitmap is violated any time that records are added or updated unless the system checks the predicate against the modified or new records.

When an update occurs that would invalidate a bitmap, the system can decide to incrementally update and maintain the integrity of the bitmap. Alternately, the system can decide to invalidate the bitmap and recreate it. Such recreation of a bitmap can either be accomplished immediately, at the next instance when the bitmap is deemed necessary by the optimizer or as a result of a specific, manual command by a user.

When the integrity of the bitmap is destroyed, it needs to be restored before it can be used in future queries. As previously mentioned, there are costs to modifying bitmap 90, and there are costs to discarding and recreating it. The database system may estimate the time required to either modify or recreate the bitmap to select the better of the two alternatives. For example, where small incremental changes have been made to the database, it is likely that the bitmap will be modified, whereas if a large number of changes have been made in the database, the bitmap will be recreated.

Figure 6:
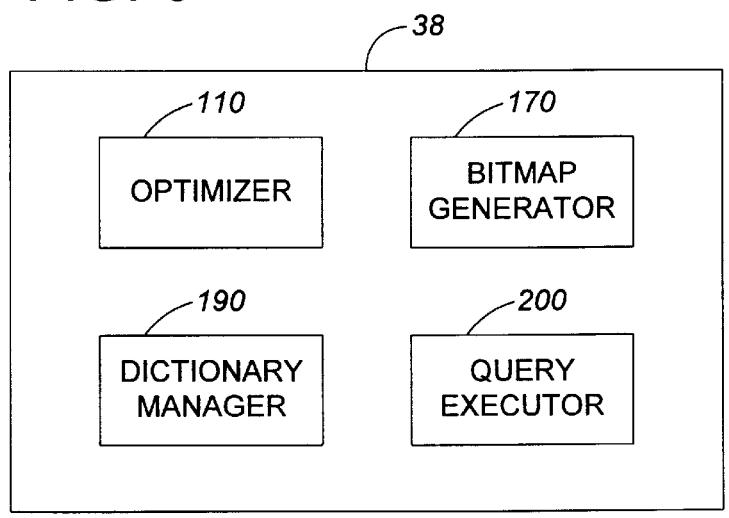
FIG. 6 illustrates the components of a database management system.

Referring to FIG. 6, the database system includes several software subsystems including an optimizer 110, a bitmap generator 170, a dictionary manager 190, and an executor 200. The subsystems interact to create and use the bitmap.

The optimizer 110 recognizes the need for a bitmap to perform co-fragment elimination, triggers an event that causes the bitmap to be built, and uses the bitmap to eliminate fragments. The bitmap generator 170 formulates a query to generate the bitmap, executes the simplified query and collects the fragment numbers from the result, and generates the bitmap from the collected fragment numbers. The dictionary manager 190 saves the bitmap in a globally accessible non-volatile storage to allow other queries and users access, and provides the bitmap to the optimizer upon request. In addition, the dictionary manager 190 marks the bitmap as invalid if data modification occurs to one or both of the underlying tables which invalidates the previous bitmap. The executor 200 uses the bitmap to perform dynamic co-fragment elimination during execution of the join query.

Figure 7:
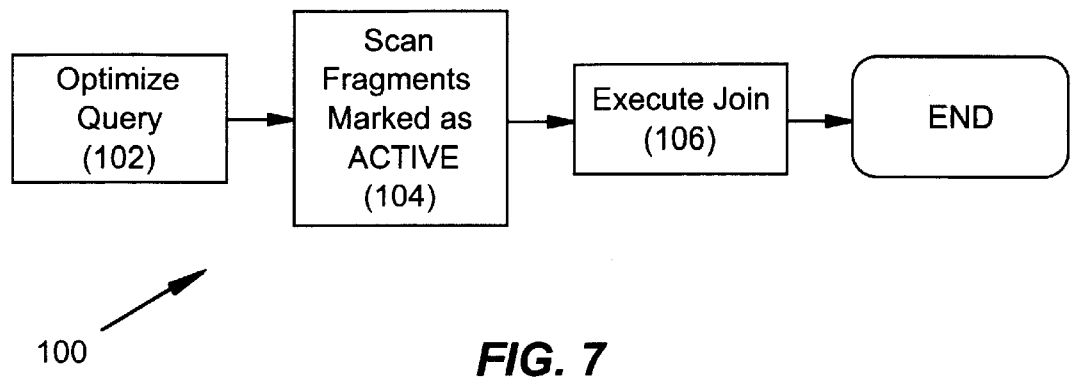
FIG. 7 is a flow diagram of the processing of a join query.

Referring to FIG. 7, the method 100 used by the database system to process a query from a user is shown. First, the database system optimizes the query (step 102), as discussed below with reference to the optimizer. Then, the database system scans the active fragments of one of the tables (step 104). If possible, the database system should scan the fragments simultaneously. A join query is executed for each record received during the scan, (step 106). Once execution of the join query is complete, the processing is done.

Figure 8:
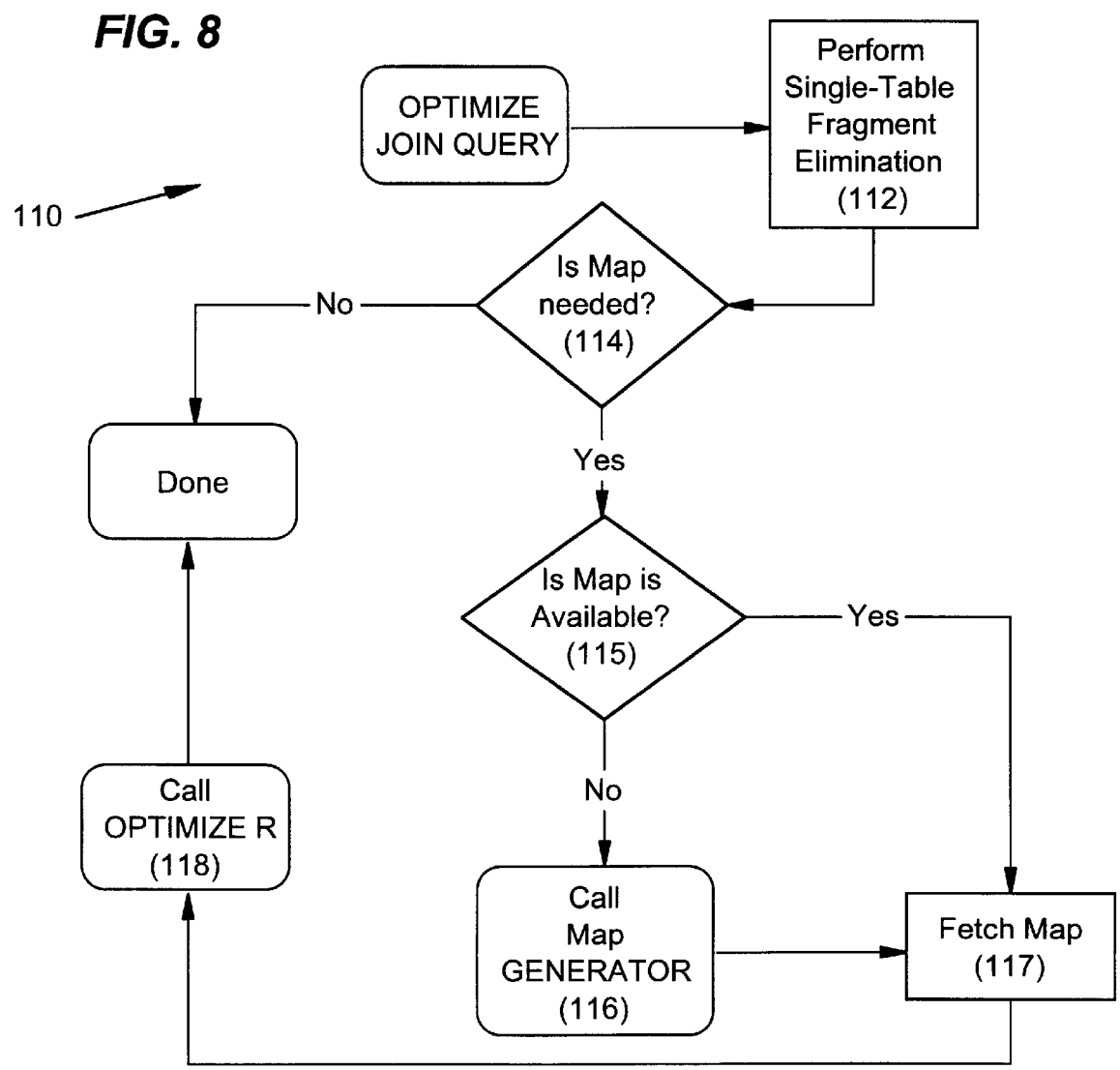
FIGS. 8, 9, and 10 are a flow diagram of a method of optimizing a join query in accordance with the present invention.

Referring to FIG. 8, the optimizer performs single-table fragment elimination on both tables R and S using the single-table query predicate (step 112), as previously discussed with reference to Example 2.

Then the database system determines whether or not a new bitmap should be generated (step 114). The user may force the database system to generate a bitmap by inserting a command or by setting a default. Alternatively, the user may allow the database system to determine whether a bitmap should be generated. In this case, the database system determines if the cost of building the bitmap is worth the benefits. Specifically, using conventional techniques, the computer system estimates the length of time to run a simplified query, generate the bitmap, store the bitmap, and execute the query using the bitmap, and compare that time to an estimated length of time to perform the query without the bitmap.

If a bitmap is needed, then the database management system determines whether a bitmap is available for the query (step 115). A bitmap may be considered available only if it was generated by a join predicate that exactly matches the join predicate of the current query, and the integrity of the bitmap has not been violated.

If a bitmap is needed, then the optimizer calls the bitmap generator (step 116). After calling the bitmap generator to generate the bitmap, or if the bitmap was already available as determined in step 115, the optimizer fetches the bitmap (step 117), and calls a subroutine to optimize one of the tables, such as Table R (step 118).

Figure 9:
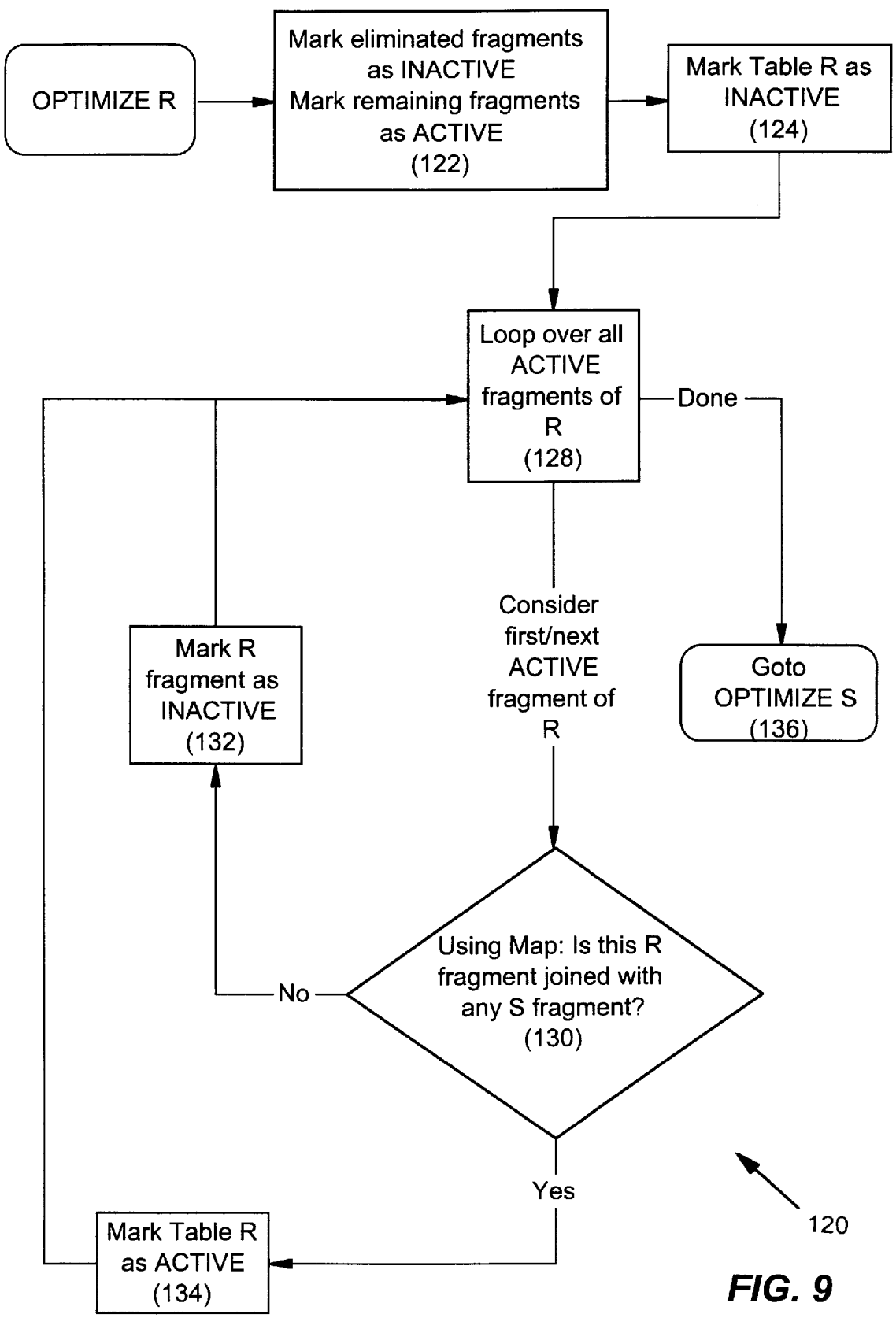

Referring to FIG. 9, the database system includes a method 120 for optimizing Table R. The database system begin by marking the fragments that were eliminated from Table R using the single-table predicates in step 112 as inactive, and marking the remaining fragments as active (step 122). Then, Table R is marked as inactive (step 124). The bitmap is then used to determine which fragments in Table S, if any, join with each active fragment from Table R. The database system enters a loop to examine each active fragment from Table R (step 128). The database system uses the bitmap to determine if the fragment from Table R contains any records which satisfy the join predicate with any record from any fragment from Table S (step 130). If there is no match, the fragment from Table R is marked as inactive (step 132). On the other hand, if there is a match, the fragment remains active and Table R is also marked as active (step 134). Once the last active fragment from Table R has been examined, the database system proceeds to a subroutine to optimize Table S (step 136).

Figure 10:
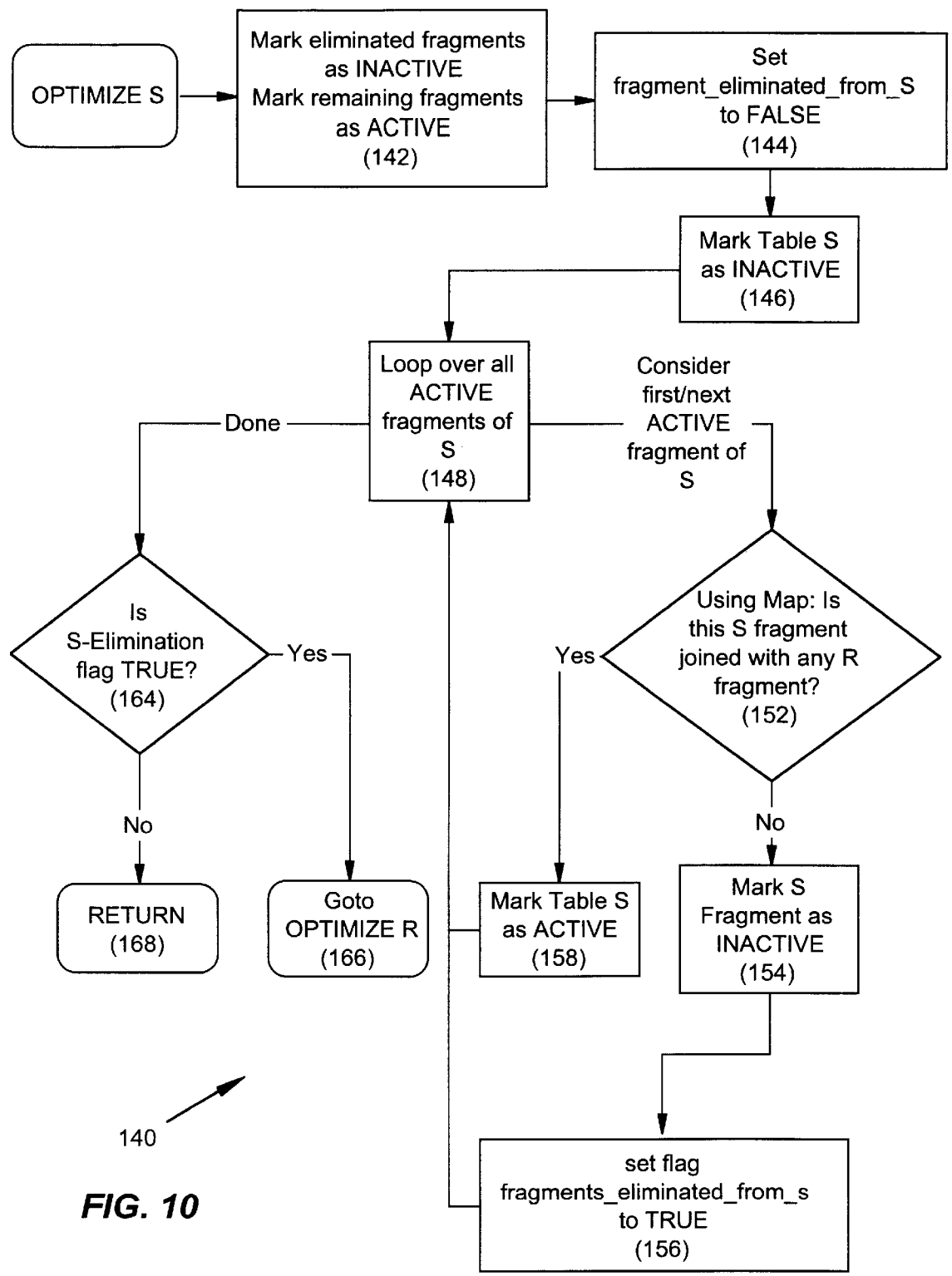

Referring to FIG. 10, the database system includes a method 140 to optimize Table S. The database system begins by marking the fragments which were eliminated from Table S in step 112 as inactive, and marking the remaining fragments of Table S as active (step 142). The computer system sets a flag (fragment_eliminated_from_S) to "false" (step 144) and marks Table S as inactive (step 146). The bitmap is then used to determine which fragments in Table R, if any, join with each active fragment from Table S. The database system enters a loop to examine each active fragment from Table S (step 148). The database system uses the bitmap to determine if the fragment from Table S contains any records which satisfy the join predicate with any record from any fragment of Table R (step 152). If there is no match, the fragment from Table R is marked as inactive (step 154) and the flag is set as "true" (step 156). On the other hand, if there is a match, the fragment remains active and Table S is marked as active (step 158). Once the fragments in both tables have been examined, if either table remains marked as inactive, then the query can halt, as it will return zero records.

Once the last active fragment from Table S has been examined, the database program checks the flag (step 164). Because some fragments from Table S may have been eliminated using the bitmap, the newly eliminated fragments from Table S can be used to attempt to eliminate some of the fragments from Table R. Therefore, if the flag is set "true", the database system returns to the method 120 for optimizing Table R (step 166). Once subroutine 120 is complete, any newly eliminated fragments from Table R are used to eliminate further fragments from Table S. Thus, the database system alternates between subroutines 120 and 140 until no more fragments can be eliminated. At this point the flag will be set "false" and the database system will return to the optimizer to commence execution of the query (step 168).

Returning to FIG. 9, if subroutine 120 was called from subroutine 140 and if no additional fragments were marked as inactive from Table R, then in step 136 the database system returns to the optimizer rather than proceeding to the subroutine 140 to optimize Table S.

Figures 11, 12:
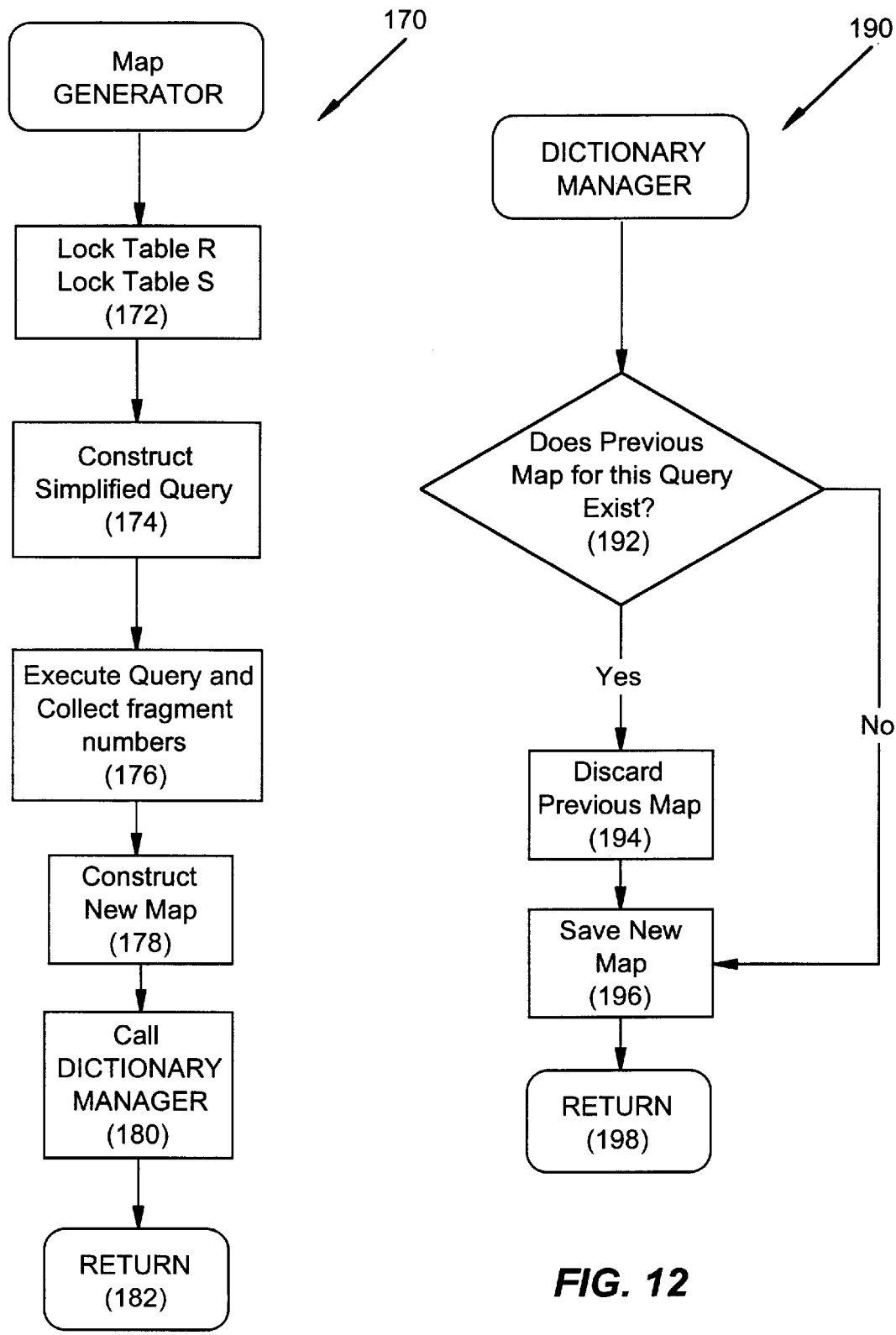
FIGS. 11 and 12 are a flow diagram of a method of generating a join bitmap in accordance with the present invention.

Referring to FIG. 11, the bitmap generator 170 begins by locking both tables to prevent the bitmap from being damaged while it is being built (step 172). A simplified query is then constructed (step 174). The simplified query contains the same join predicate as the query presented by the user, but all single-table predicates are removed. The simplified query is executed, and the fragment numbers from both tables are collected from the query results (step 176) to provide two field-fragment tables (e.g., fragment tables 60 and 70). Then the fragment numbers from the field-fragment tables 60 and 70 are used to construct the bitmap 90 (step 178). Finally, the dictionary manager subroutine 190 is called (step 180), the locks are released, and the database system returns to the optimizer (step 182).

Referring to FIG. 12, the dictionary manager 190 begins by determining whether a previous bitmap has been created for the join predicate of the current query (step 192). If a previous bitmap exists, then the old bitmap is discarded (step 194) and the new bitmap is saved (step 196). If there is no old bitmap for this query, then the step of discarding the previous bitmap may be skipped. Finally, the database system returns to the bitmap generator subroutine (step 198).

Figure 13:
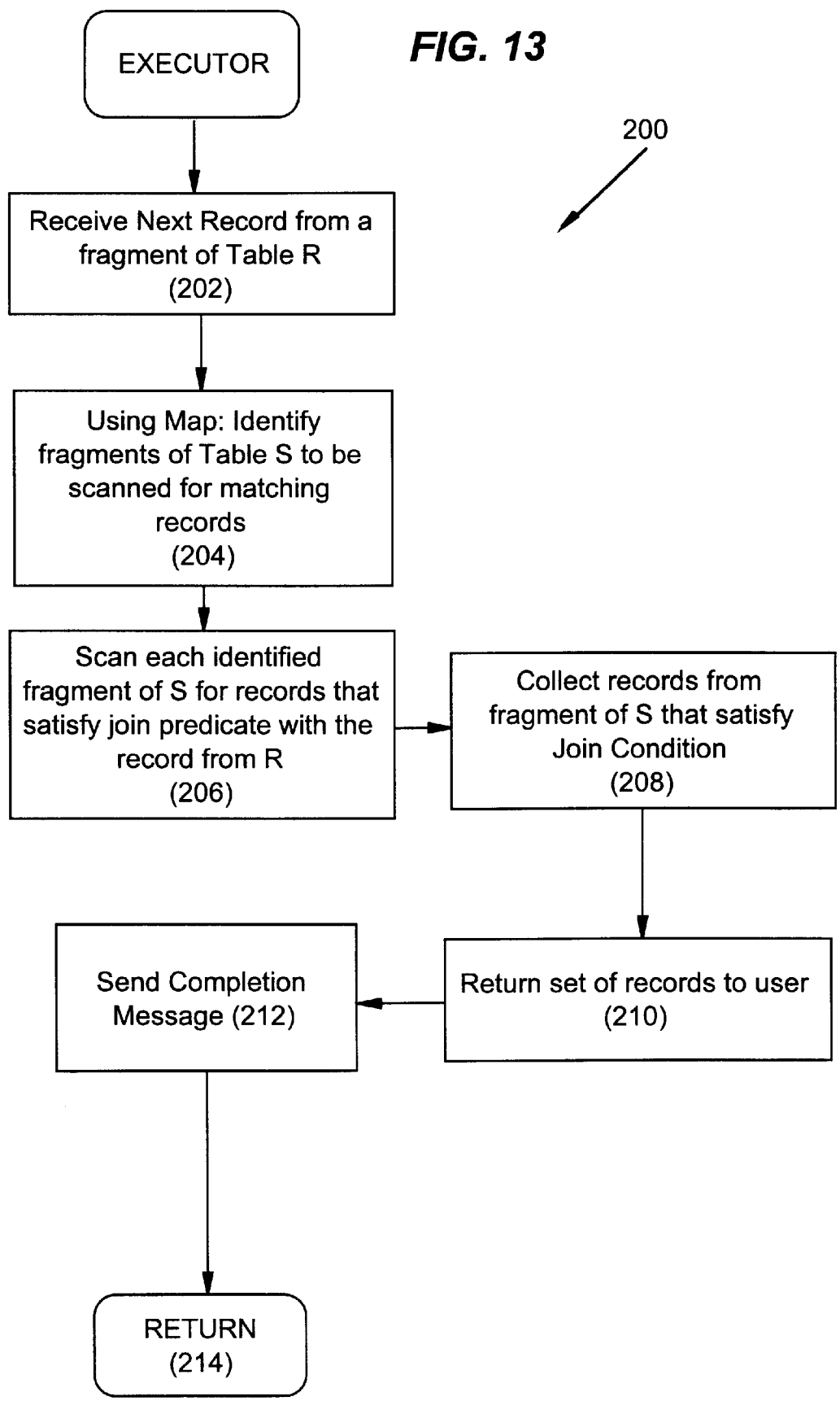
FIG. 13 is a flow diagram of a method of executing a query in accordance with the present invention.

Referring to FIG. 13, executor 200 is called when the database system executes the join query in step 106 (see FIG. 7). In brief, the executor receives a record from an active fragment of one of tables. The executor uses the fragment number and the bitmap to identify the fragments from the other table that should be scanned. The executor scans those fragments, collects the matching records from the fragments, and returns the matching records to the user.

The executor begins by receiving a record from an active fragment of one Table R (step 202). The record is received from Table R in this example, although Tables R and S could be switched in the operations discussed below. Then the database system uses the join fragment map to identify the fragments of Table S that should be scanned for matching records (step 204). Specifically, if the join fragment map is a bitmap, the database system accesses the bit at a row equal to the fragment number of Table R and a column equal to the fragment number of Table S to determine whether that pair of fragments contain records which satisfy the join predicate. The identified fragments of Table S are scanned for records that satisfy the join predicate (step 206). These records are collected (step 208) and returned to the user (step 210). Finally, a completion message is sent to the user (step 212) and the executor ends (step 214).

Although illustrated as a linear process, the method of executor 200 can be carried out in a looped process in which each active fragment from Table S is examined, the bitmap is used to determine whether the fragment should be scanned, the fragment is scanned (assuming it contains matching records) and records that satisfy the join predicate are returned to the user, and the process advances to the next active fragment.

The invention is described in terms of a software implementation, the invention may be implemented in software or hardware or firmware, or a combination of the three.

The present invention has been described in terms of an embodiment. The invention, however, is not limited to the embodiment depicted and described. Rather, the scope of the invention is defined by the appended claims.

What is claimed is:

1. A computer implemented method for generating a response to a join having a join predicate between a first table having a first plurality of fragments and a second table having a second plurality of fragments, the method comprising:

retrieving a join fragment map that, for each respective fragment from the first table, identifies the fragments from the second table which contain a record that satisfies the join predicate with a record from the respective fragment from the first table;

using the map to eliminate fragments which cannot satisfy the join predicate; and executing the join on the remaining fragments.

2. A computer-implemented method for processing a join between a first table having a first plurality of fragments and a second table having a second plurality of fragments, the method comprising:

retrieving a join fragment map that, for each respective fragment from the first table, identifies the fragments from the second table which contain a record that satisfies a join predicate of the join with a record from the respective fragment from the first table;

identifying fragments possibly having records that satisfy the join predicate by applying the map; and executing the join on the identified fragments.

3. The method of claim 2 further comprising identifying a first set of fragments from the first table which satisfy a single-table predicate of the join.

4. The method of claim 3 wherein identifying fragments includes using the map to identify a second set of fragments from the second table which satisfy the join predicate with the first set of fragments.

5. The method of claim 4 wherein executing the query includes executing the query on the first set of fragments and the second set of fragments.

6. The method of claim 2 wherein identifying fragments includes using the map to identify a first set of fragments from the first table which may satisfy the join predicate.

7. The method of claim 6 wherein identifying fragments further includes using the map to identify a second set of fragments from the second table which may satisfy the join predicate with the first set of fragments.

8. The method of claim 7 wherein identifying fragments further includes using the map to identify a subset of the first set of fragments which may satisfy the join predicate with the second set of fragments.

9. The method of claim 8 wherein identifying fragments further includes using the map to identify a subset of the second set of fragments which may satisfy the join predicate with the subset of the first set of fragments.

10. The method of claim 9 wherein the steps of identifying subsets are iterated until no further fragments are eliminated.

11. In a system operating to execute queries on database tables and supporting separation of tables into fragments, a computer-implemented method for applying a join operation to a first table and a second table, comprising:

identifying for each fragment of the first table those fragments of the second table that contain a record satisfying the join predicate with a record from the first table fragment and storing the identification in a map;

identifying a first set of fragments from the first table having records satisfying a single-table predicate of the query;

identifying a second set of fragments from the second table containing records that satisfy the join predicate with records from the first set of fragments by applying the map; and executing the query on the first set of fragments and the second set of fragments.

12. A computer-implemented method for processing a join between a first table having a first plurality of fragments and a second table having a second plurality of fragments, the method comprising:

retrieving a map that, for each respective fragment from the first table, identifies the fragments from the second table which contain a record that satisfies a join predicate of the join with a record from the respective fragment from the first table;

receiving a record from the first table;

using the map to identify a set of fragments from the second table which satisfy the join predicate with the fragment of the received record; and scanning the identified set of fragments for records that satisfy the join predicate with the received record.

13. The method of claim 12 further comprising using the map to select a fragment containing a record which satisfies the join predicate, and wherein the receiving, using and scanning steps are applied to every record from the selected fragment.

14. A method of executing a query having a join operation with a join predicate that is applied to a first table and a second table that can be separated into fragments, comprising:

identifying, for each fragment of the first table, those fragments of the second table that contain a record satisfying the join predicate with a record from the first table fragment;

storing a map that, for each fragment of the first table, indicates the identified fragments of the second table;

receiving a record from the first table;

identifying a set of fragments from the second table having records satisfying the join predicate with the received record by applying the map; and scanning the identified set of fragments for records that satisfy the join predicate with the received record.

15. In a database system supporting separation of tables into fragments, a method of optimizing a join having a join predicate on a first table and a second table, comprising:

executing a simplified query having the join predicate to create a join fragment map, the join fragment map identifying for each fragment of the first table those fragments of the second table that contain a record satisfying the join predicate with a record from the fragment of the first table.

16. The method of claim 15 wherein the join fragment map lists for each fragment of the first table those fragments of the second table that contain a record satisfying the join predicate with a record from the first table fragment.

17. The method of claim 15 wherein the creation of a join fragment map is triggered by the definition of a referential integrity constraint between two tables.

18. The method of claim 15 wherein the simplified query does not contain any single-table predicates from the query.

19. The method of claim 15 wherein the simplified query contains a single simple join predicate.

20. The method of claim 15 further comprising updating the join fragment map if records from the first table or the second table are added or modified.

21. The method of claim 15 further comprising retrieving the join fragment map for a new query having the same join predicate as the original query and at least one different predicate.

22. The method of claim 15 further comprising:

using the join fragment map to select fragments of the first table and fragments of the second table to which to apply the original query.

23. In a database system supporting separation of tables into fragments, a method of optimizing a join having a join predicate on a first table and a second table, comprising:

executing a simplified query having the join predicate to create a join fragment map, the join fragment map identifying for each fragment of the first table those fragments of the second table that contain a record satisfying the join predicate with a record from the fragment of the first table, wherein the join fragment map is a bitmap having a bit for each pair of fragments from the first table and the second table.

24. The method of claim 23 further comprising compressing the bitmap.

25. The method of claim 23 further comprising selecting a first fragment from the first table, selecting a second fragment from the second table, and checking the bit corresponding to the pairing of the first fragment and second fragment to determine whether the pair of fragments contains a record satisfying the join predicate.

26. The method of claim 23 wherein the creation of the bitmap is aborted if the bitmap becomes too full.

27. The method of claim 23 wherein the first and second tables are sampled to determination of whether the bitmap will be sufficiently sparse.

28. The method of claim 23 wherein the creation of a bitmap is triggered by a discovery process in which the server joins various columns of different tables to located for bitmaps with a sparse number of bits turned on.

29. In a database system supporting separation of tables into fragments, a method of optimizing a join having a join predicate on a first table and a second table, comprising:

executing a simplified query having the join predicate to create a join fragment map, the join fragment map identifying for each fragment of the first table those fragments of the second table that contain a record satisfying the join predicate with a record from the fragment of the first table; and storing the join fragment map in volatile memory.

30. In a database system supporting separation of tables into fragments, a method of optimizing a join having a join predicate on a first table and a second table, comprising:

executing a simplified query having the join predicate to create a join fragment map, the join fragment map identifying for each fragment of the first table those fragments of the second table that contain a record satisfying the join predicate with a record from the fragment of the first table; and creating the join fragment map by triggering an explicit user data definition command.

31. In a system operating to execute queries on relational database tables and supporting separation of tables into fragments, a method of optimizing a query having a join predicate on a first table and a second table, comprising:

identifying a first set of fragments being those fragments of the first table having records possibly satisfying the join predicate;

identifying a second set of fragments being those fragments of the second table having records possibly satisfying the join predicate; and executing the query on the identified fragments.

32. The method of claim 31 wherein the first set of fragments is identified by a join fragment map identifying for each fragment of the first table those fragments of the second table that contain a record satisfying the join predicate with a record from the first table fragment.

33. The method of claim 31 wherein executing the query on the identified fragments comprises:

retrieving a record from a selected fragment from the first set of fragments;

identifying a subset of fragments from the second set of fragments, the subset being those fragments of the second table having records possibly satisfying the join predicate with the selected fragment; and scanning the subset of fragments for records satisfying the join predicate.

34. A method of processing join queries in a system operating to execute queries on relational database tables and supporting separation of tables into fragments, comprising:

executing a simplified query having the join predicate to create a join fragment map, the join fragment map identifying for each fragment of the first table those fragments of the second table that contain a record satisfying the join predicate with a record from the first table fragment;

using the join fragment map to identify a first set of fragments being those fragments of the first table having records satisfying the join predicate;

using the join fragment map to identify a second set of fragments being those fragments of the second table having records satisfying the join predicate;

retrieving a record from a selected fragment from the first set of fragments;

identifying a subset of fragments from the second set of fragments, the subset being those fragments of the second table having records satisfying the join predicate with the selected fragment; and scanning the subset of fragments for records satisfying the join predicate.

35. A computer program, residing on a computer-readable medium, comprising instructions causing a computer to operate to:

retrieve a join fragment map that, for each respective fragment from the a first table, identifies the fragments from the second table which contain a record that satisfies a join predicate with a record from the respective fragment from the first table;

use the map to eliminate fragments which cannot satisfy the join predicate;

execute the join on the remaining fragments.

* * * * *